United States Patent [19]

Meyers, Jr.

[11] 3,879,536
[45] Apr. 22, 1975

[54] CONTROL OF BACTERIA AND FUNGI IN AQUEOUS SYSTEMS

[75] Inventor: William J. Meyers, Jr., Mentor, Ohio

[73] Assignee: Diamond Shamrock Corporation, Cleveland, Ohio

[22] Filed: Dec. 4, 1972

[21] Appl. No.: 312,217

[52] U.S. Cl. .............................. 424/275; 424/337
[51] Int. Cl. .......................... A01n 9/12; A01n 9/14
[58] Field of Search ............................ 424/275, 337

[56] References Cited
UNITED STATES PATENTS
2,957,887   10/1960   Berkey et al. ................... 424/275 X OTHER PUBLICATIONS
Chemical Abstracts 61: 6259f (1964).

Primary Examiner—Albert T. Meyers
Assistant Examiner—Leonard Schenkman
Attorney, Agent, or Firm—Timothy E. Tinkler

[57] ABSTRACT

A composition consisting essentially of 3,3,4,4-tetrachlorotetrahydrothiophene-1,1-dioxide and bis(trichloromethyl)sulfone exhibits a synergistic effect in the inhibition of growth of microorganisms in aqueous systems.

3 Claims, No Drawings

CONTROL OF BACTERIA AND FUNGI IN AQUEOUS SYSTEMS

BACKGROUND OF THE INVENTION

That the uncontrolled growth of microorganisms in water can lead to slime formation is well known. Slime formation is of particular concern in industrial processes wherein water is recirculated, e.g., in industrial cooling waters and in white waters found in the pulp and paper industry. A variety of compounds and compositions for the inhibition of such growth are known. One such compound is 3,3,4,4-tetrachlorotetrahydrothiophene-1,1-dioxide, the subject of U.S. Pat. No. 2,957,887. Another is bis(trichloromethyl)sulfone, claimed in U.S. Pat. No. 2,959,517 to be an effective microbiocide. Often, however, these compounds must be used in relatively large concentrations to obtain the desired effect.

STATEMENT OF THE INVENTION

Therefore, it is an object of the present invention to provide a synergistic microbiocidal composition.

It is a further object of the present invention to provide a method for inhibiting the growth of microorganisms in aqueous systems.

It is a still further object of the present invention to provide a synergistic composition for inhibiting slime formation in industrial process waters.

These and further objects of the present invention will become apparent to those skilled in the art from the specification and claims which follow.

It has now been found that a composition consisting essentially of from 10–90% by weight of 3,3,4,4-tetrachlorotetrahydrothiopene-1,1-dioxide and from 90–10% of bis(trichloromethyl)sulfone is more effective than either compound alone in inhibiting the growth of microorganisms in aqueous systems. Therefore, the use of such synergistic compositions at equivalent rates to either compound alone will generally provide a superior inhibiting effect. Conversely, lesser amounts of the composition will generally provide an inhibiting effect equivalent to that obtained with the use of a larger amount of either compound.

DESCRIPTION OF THE PREFERRED EMBODIMENTS

The synergistic compositions of the present invention consist essentially of from 10–90% by weight of 3,3,4,4-tetrachlorotetrahydrothiophene-1,1-dioxide together with from 90–10% by weight of bis(trichloromethyl)sulfone. Preferably, 3,3,4,4-tetrachlorotetrahydrothiophene-1,1-dioxide is present within the range of from 40–60% of the composition.

The composition will find primary application in the treatment of aqueous systems to inhibit the growth of microorganisms therein. Such materials are often referred to as slimicides for their ability to prevent the formation of slimes so offensive to industrial processes in which recirculated water is employed. Exemplary of such processes are those in which the water serves as a cooling medium, e.g., air conditioning systems, and the paper industry wherein the water is a carrier for cellulosic fibers. In the former application, the formation of slime on heat exchanging surfaces impairs the efficiency of the heat exchange. In the latter process, in addition to the mechanical problems caused by slime formation, the slime contaminates the paper web itself, resulting in odor and other problems.

A variety of microorganisms have been found responsible for this slime formation, including both bacterial and bacteria Exemplary of the microorganisms causing such problems and being controlled by the compositions of the present invention are: bacteria - *Pseudomonas aeruginosa, Aerobacter cloacae, Bacillus subtilis, Aerobacter aerogenes, Bacillus mycoides, Desulfovibrio desulfuricans, Clostridia, Staphylococcus aureus, Erwinia amylovora,* and *Escherichia coli;* fungi - *Penicillium glaucum, Penicillium expansum, Cephalosporium, Aspergillus terreus, Trichoderma, Sclerotinia fructicola,* and *Aspergillus niger.*

Thus, the term "microbiocide" refers to a material capable of inhibiting the growth of the aforementioned and related bacteria and fungi. A "microbiocidally effective amount" refers to the quantity of microbiocide effective to obtain the desired inhibition. Generally speaking, a concentration within the aqueous system on the order of 0.5–100 parts per million (ppm), preferably 1–20 ppm, is effective. Depending upon the operation, however, it may be desired to at least temporarily maintain a higher concentration of the microbiocide to effect a shock treatment, particularly where the microorganism exhibits a tendency to develop an immunity to the microbiocide if exposed for extended periods of time to lesser concentrations.

From the foregoing, it can be understood that slime inhibition with the compositions of the present invention involves either the intermittent addition of the microbiocide to the aqueous system or the maintenance of a constant, but generally somewhat lower, concentration.

Preparation and properties of the individual compounds of the composition are known from the prior art. Formulation of the composition itself can involve little more than intimate physical admixture of the compounds. Generally, for the sake of convenience of application and to insure homogeneity, the composition is provided as a solution or emulsion containing, conveniently, up to about 25% by weight of active ingredients. Typical is a formulation in which approximately 15% by weight of the composition is emulsified with 10% dimethylformamide and 70% xylene, 10% of a nonionic surfactant serving to provide and maintain the emulsion. Combinations with other ingredients for convenience of shipping, storage, and application will suggest themselves to one skilled in the art.

In order that those skilled in the art may more readily understand the present invention and certain preferred embodiments by which it may be carried into effect, the following specific example is afforded.

EXAMPLE

The procedure for evaluating the effectiveness of a biocide is as follows.

1. A 1000 ppm acetone solution of each biocidal compound or composition to be evaluated is prepared.
2. Fifty milliliters of sterile water is added to a sterile Erlenmeyer flask.
3. A sufficient quantity of biocide solution is added to give the desired concentration. For control, a like amount of acetone without biocide is employed.
4. A one ml suspension of the microorganism in water is added.
5. The flask is stoppered and shaken for 3 hours.

6. Using a sterile pipette, a one ml sample is transferred from the flask to another sterile flask containing 100 ml of sterile distilled water.

7. A sterile Tryptone Glucose Extract Agar (Difco) is prepared and allowed to cool to 40°C.

8. Again employing a sterile pipette, one ml of the diluted sample is spread on a sterile Petri dish.

9. The agar is then poured into the Petri dish, moving the dish up, down, and sideways to obtain even distribution.

10. Upon hardening, the agar is incubated for 24 hours at 37° C.

11. The number of colonies is then counted in the large square of a Quebec Colony Counter and multiplied by 6400 to obtain the number of microorganisms per ml.

For a white water sample, the above procedure differs only in that the sterile water of step (2) is replaced with undiluted white water in a like amount and step (4) is eliminated.

Specifically, for the microorganisms recited in the following table, 0.5 ml of a 100 ppm biocide solution (prepared by diluting the 1000 ppm solution with acetone) is employed to give a concentration of 1.0 ppm. A like amount of acetone is employed in the control. For the white water test (white water indicating a slurry of cellulosic fiber in water obtained from a paper mill and containing a variety of microorganisms, the exact nature of which is undetermined), a biocide concentration of 10 ppm (0.5 ml, 1000 ppm solution) is employed. In the table, Compound I is 3,3,4,4-tetrachlorotetrahydrothiophene-1,1-dioxide and Compound II is bis(trichloromethyl)sulfone. The compound percentages are by weight and "Count" is measured in microorganisms/ml.

TABLE

| Cmpd. I (%) | Cmpd. II (%) | Aerobacter aerogenes | | Bacillus subtilis | | Penicillium expansum | | A. aerogenes B. subtilis P. expansum | | White water | |
|---|---|---|---|---|---|---|---|---|---|---|---|
| | | Count | Reduction (%) | Count | Reduction (%) | Count | Reduction (%) | Count | Reduction (%) | Count | Reduction (%) |
| 0 | 0 | 435,200 | — | 345,600 | — | 806,400 | — | 428,800 | — | 576,000 | — |
| 100 | 0 | 249,600 | 43 | 268,800 | 22 | 256,000 | 68 | 390,400 | 9.0 | 518,400 | 10 |
| 90 | 10 | 211,200 | 51 | 230,400 | 33 | 236,800 | 71 | 268,800 | 37 | 454,400 | 21 |
| 80 | 20 | 140,800 | 68 | 198,400 | 43 | 166,400 | 79 | 140,800 | 67 | 441,600 | 23 |
| 70 | 30 | 121,600 | 72 | 192,000 | 44 | 147,200 | 82 | 128,000 | 70 | 436,800 | 24 |
| 60 | 40 | 54,400 | 88 | 166,400 | 52 | 118,600 | 85 | 102,400 | 76 | 390,800 | 33 |
| 50 | 50 | 25,600 | 94 | 140,800 | 59 | 179,200 | 78 | 64,000 | 85 | 332,800 | 42 |
| 40 | 60 | 89,600 | 79 | 111,200 | 68 | 204,800 | 75 | 57,600 | 87 | 281,600 | 51 |
| 30 | 70 | 89,600 | 79 | 147,200 | 57 | 172,800 | 79 | 76,800 | 82 | 300,800 | 48 |
| 20 | 80 | 108,800 | 75 | 160,800 | 54 | 236,800 | 71 | 147,400 | 66 | 339,200 | 41 |
| 10 | 90 | 115,200 | 74 | 166,400 | 52 | 236,800 | 71 | 249,600 | 42 | 416,600 | 28 |
| 0 | 100 | 224,000 | 49 | 198,400 | 43 | 249,600 | 69 | 300,800 | 30 | 460,800 | 20 |

The foregoing table clearly indicates an unexpected synergistic effect at all concentrations. Control of the individual microorganisms (both bacteria and fungus), the microorganisms in admixture, and the white water sample having an undetermined microorganism composition, substantiates the usefulness of the compositions of the present invention for the control of a variety of microorganisms.

Although the invention has been described by reference to certain particular and preferred embodiments thereof, its scope is not to be so limited but is to be interpreted within the light of the specification and appended claims.

I claim:

1. A composition capable of inhibiting the formation of bacteria and fungi-caused slimes in water consisting essentially of from 10 to 90% by weight of 3,3,4,4-tetrachlorotetrahydrothiophene-1,1-dioxide and 90 to 10% of bis(trichloromethyl)sulfone.

2. The composition of claim 1 wherein 3,3,4,4-tetrachlorotetrahydrothiophene-1,1-dioxide is present within the range of 40 to 60%.

3. A method of inhibiting bacteria and fungi-caused slime formation in water, which comprises dispersing in said water a slime inhibiting amount of from 1 to 10 ppm of a composition consisting essentially of from 10 to 90% by weight of 3,3,4,4-tetrachlorotetrahydrothiophene-1,1-dioxide and from 90 to 10% of bis(trichloromethyl)sulfone.

* * * * *